May 18, 1965
AKIRA TANAKA
3,184,208
SEAT ADJUSTER SYNCHRONIZER
Filed May 29, 1963
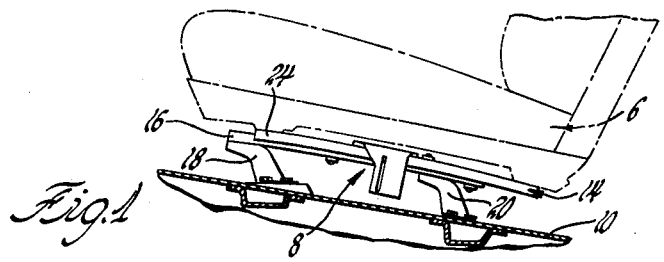
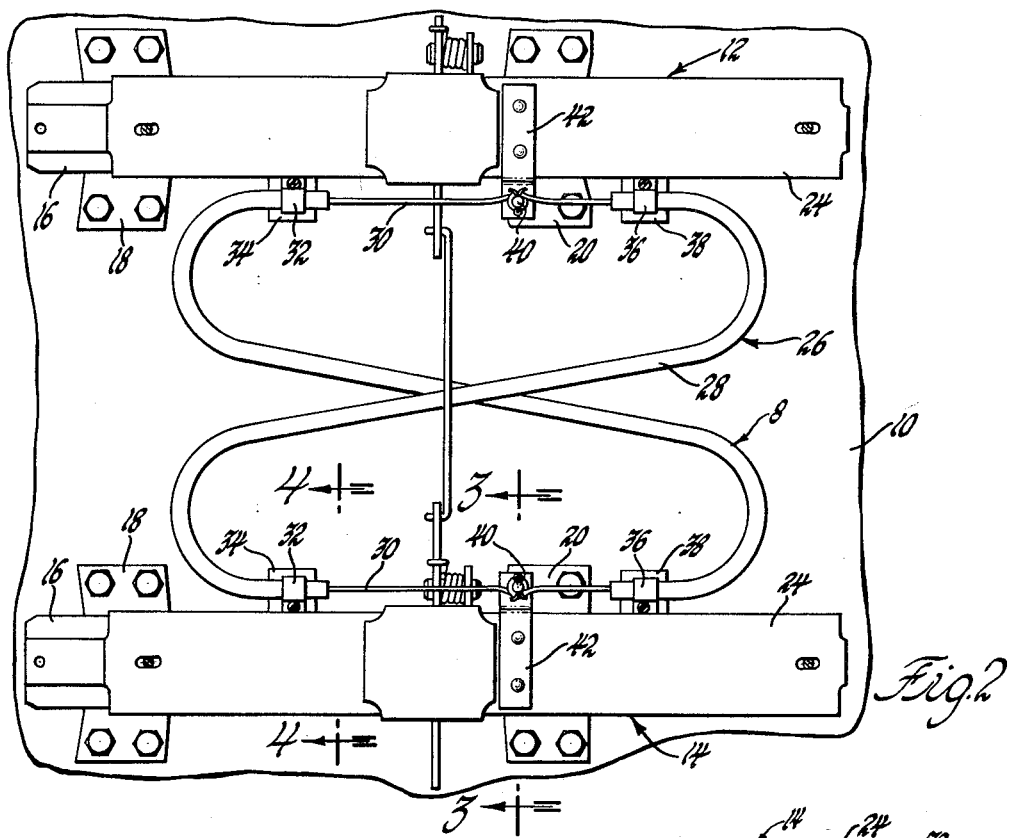
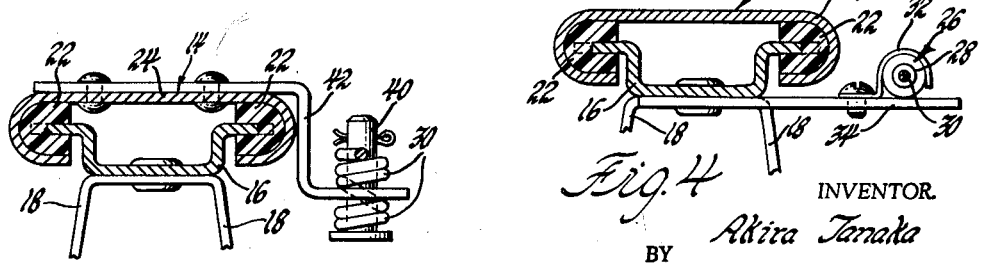
INVENTOR.
Akira Tanaka
BY
R. L. Spencer
ATTORNEY

United States Patent Office 3,184,208
Patented May 18, 1965

3,184,208
SEAT ADJUSTER SYNCHRONIZER
Akira Tanaka, Southfield, Mich., assignor to General Motors Corporation, Detroit, Mich., a corporation of Delaware
Filed May 29, 1963, Ser. No. 284,115
8 Claims. (Cl. 248—429)

This invention relates generally to vehicle seat adjusters for adjusting a seat longitudinally of the vehicle and has particular reference to seat adjusters of the type having transversely spaced adjuster mechanisms for adjusting the seat longitudinally.

In seat adjusters of the type having an adjuster mechanism at each end of the seat for moving the seat fore and aft in the vehicle body, it is usually difficult to use tie members, such as torque tubes, to tie the two mechanisms together for uniform longitudinal movement due to the drive shaft bump in the center of the vehicle floor. Consequently, the seat adjuster mechanisms have a tendency to get out of phase or cant, so that the opposite ends of the seat move unevenly and tend to bind the seat adjuster mehanisms during adjustment thereof, leading to an uneven irregular movement.

It is an object of the present invention to provide a flexible Bowden wire element for keeping a spaced pair of seat adjuster mechanisms in phase.

It is a further object of the present invention to simplify the installation of the Bowden wire element by requiring only three attaching points to each mechanism and thereby provide a push and pull force at each mechanism for keeping the mechanisms in phase during movement.

Another object of the present invention is to provide a single continuous Bowden wire element in the shape of a figure 8 which will provide pushing and pulling forces on each seat adjuster mechanism as the seat is moved.

These and other objects will become more apparent as reference is had to the accompanying specification and drawings wherein:

FIGURE 1 is a side view of a vehicle seat (in phantom lines) mounted on a conventional manual seat adjuster unit adapted to use with the synchronizing means of this invention.

FIGURE 2 is a plan view of the conventional seat adjuster unit of FIGURE 1 showing a Bowden wire element interconnecting the adjuster mechanisms in accordance with the present invention.

FIGURE 3 is a view substantially along the line 3—3 of FIGURE 2 illustrating the manner in which the wire of the Bowden wire element is attached to the upper movable track of a seat adjuster mechanism.

FIGURE 4 is a view substantially along the line 4—4 of FIGURE 2 illustrating the manner in which the Bowden wire element casing is secured to the lower fixed track of a seat adjuster mechanism.

The illustrated seat adjuster unit has identical left and right seat adjusted mechanisms, therefore the same numerals will be used to identify similar parts of the mechanisms in this description.

Referring now to the drawings and particularly to FIGURE 1, a vehicle seat 6 (in phantom lines) is supported for fore and aft adjustment on a seat adjusting unit, indicated generally by the numeral 8, which is secured on a vehicle floor 10 by bolts or other suitable means. As best seen in FIGURE 2, the seat adjuster unit 8 consists of a right adjuster mechanism 12 and a left adjuster mechanism 14. Since the seat adjuster mechanisms are substantially identical in construction, only the left hand seat adjuster mechanism 14 will be explained.

Referring to FIGURES 1 and 2, the lower track member 16 is secured to the vehicle floor 10 by a front bracket 18 and a rear bracket 20. As seen in FIGURES 3 and 4, a plurality of bearing slugs 22 of anti-friction material are secured at spaced intervals to the lower track 16. The outer surface of each slug is curved on the same curvature as the inner surface of an upper track member 24 so that the slugs engage both channel members substantially along their entire length and aid the upper channel member 24 in sliding longitudinally fore and aft relative to the fixed lower channel member 16. The upper channel member 24 is adapted to have a seat secured thereto for movement therewith.

The horizontal seat adjuster track mechanism per se is of the type disclosed in the U.S. patent to Weberman, No. 3,013,763, and operates in the same manner. Therefore, since this track mechanism per se comprises no part of the present invention, further description is deemed unnecessary as a more detailed description of its operation may be had by reference to the above cited patent.

A single continuous Bowden wire 26 having an outer casing 28 and a movable inner wire core 30 is mounted in the double-loop form of a figure 8 between the seat adjuster mechanisms 10, 12 for synchronizing their fore and aft movements.

As best seen in FIGURE 2, with reference to FIGURES 3 and 4 for details of structure, one loop of the Bowden wire 26 is secured to the left seat adjuster mechanism 14 and the other loop of the Bowden wire is secured to the right seat adjuster mechanism 12. The casing 28 of the Bowden wire is secured by a clamp 32 on a support arm 34 which in turn is secured by rivets or other suitable means to the front of the lower track member 16. The casing 28 is similarly secured at a second point on the seat adjuster mechanism by a clamp 36 secured to a support arm 38 which in turn is secured to the lower track member 16 by a rivet or other suitable means. The casing 28 is removed from the Bowden wire element adjacent the seat adjuster mechanism between the clamps 32, 36 exposing a portion of the wire 30. The exposed wire is anchored to a pin 40 mounted on a support arm 42 which is secured by rivets or other suitable means to the upper track member 24 for movement therewith. As best seen in FIGURE 2, by securing both ends of the wire 30 to the single pin 40, the wire 30 forms a continuous closed double-loop figure 8. Thus, if the upper track 24 of the left hand adjusting mechanism 14 is moved forwardly, the pin 40 moves the wire 30 under compression towards brackets 34 and under tension away from brackets 38. This movement of the wire adjacent the mechanism 14 is transmitted through the Bowden wire element 26, to the right hand adjuster mechanism 12 where the wire 30 is under tension, from the pin 40, towards the bracket 34, and under compression from the bracket 38 to the pin 40, thus urging the upper track 24 of the mechanism 12 in a forward direction. The forces would be reversed when the seat is moved to the rear.

It will be apparent that the arrangement is of very simple and economical construction in that only three attaching points, namely the clamps 32, 36 and the single pin 40 are required for assembling the Bowden wire 26 to each side of the adjuster mechanism. While the use of Bowden wires for equalizing purposes has been heretofore suggested, the previous suggestions have not provided the continuous closed loop arrangement of the Bowden wire taught herein and have required at least four points of connection to each side of the adjuster mechanism assembly. By providing a single common pin 40 located intermediate the clamps 32 and 36 to which the ends of the Bowden wire are secured, a simpler structure which is more economical to manufacture and assemble is provided in that at least two points of attachment and the labor required for their assembly are eliminated. The removal of two spaced segments of the outer casing of the Bowden wire to present two bared segments of movable wire extending between the attaching clamps whereby the outer casing is retained in fixed position makes possible the single attachment whereby the bared movable wire is attached to each of the movable rails.

While the preferred embodiment of the present invention has been shown and described herein, it is obvious that many structural details may be changed without departing from the spirit and scope of the following claims.

I claim:

1. In a vehicle seat adjuster unit having a pair of spaced parallel adjusting mechanisms extending from front to rear of a vehicle body for moving a vehicle seat fore and aft relative to a vehicle floor, each mechanism having a fixed member secured to said floor and a movable member secured to said seat, said movable member being interconnected with said fixed member for coacting with said fixed member for moving said seat fore and aft, a control means for controlling simultaneous movement of said movable members of said mechanism comprising: a Bowden wire element interconnecting said mechanisms, said element having an outer casing and a wire movable relative to said casing, clamping means for securing said casing at two points to a corresponding member of each of said mechanisms, one of said secured points being at the front of said member and the other of said secured points being at the rear of said member, said wire having a portion thereof extending from said casing between said two secured points adjacent said members, a connecting pin for securing said extended portion of the wire to the other corresponding member of each of said adjuster mechanisms intermediate said secured points, said element extending from the front secured point of one mechanism to the rear secured point of the other for forming a continuous double-looped control means.

2. In combination with a pair of spaced vehicle seat adjuster mechanisms for adjustably supporting opposite ends of a vehicle seat on a vehicle floor, each mechanism having a fixed track member interconnected with a movable track member for adjusting said seat fore and aft, a control means for controlling simultaneous movement of said movable track members for uniform movement of the opposite ends of said seat comprising: a continuous double-loop Bowden wire assembly interconnecting said adjuster units for synchronizing relative movement thereof, said Bowden wire assembly comprising an outer casing and an enclosed wire movable relative to said casing, fastening means for securing said casing at two points to each fixed track member on each adjuster mechanism, a portion of said wire extending from said casing between said two secured points on each adjuster mechanism, a connecting means for securing said extended portions of said wire to said movable tracks for movement therewith.

3. In combination with a vehicle seat adjustably supported on a vehicle floor by a pair of spaced adjuster mechanisms, each mechanism having a fixed track member secured to said vehicle floor and a movable track member adapted to support said vehicle seat, said movable tracks engaging said fixed tracks for longitudinal movement therebetween and for moving said seat longitudinally relative to said vehicle floor, a synchronizing means for keeping each adjuster mechanism in phase with the other adjuster mechanism comprising: a continuous double looped Bowden wire element in the form of a figure 8 for interconnecting the adjuster mechanisms, said Bowden wire element having an outer casing and an inner wire core movable within said casing, fastening means for connecting one loop of said Bowden wire element at three points to one adjuster mechanism and the other loop of said Bowden wire element at three points to the other adjuster mechanism, said casing being secured to one of said track members at each end of said member wherein the distance between said secured points is greater than the range of movement of one track member relative to the other track member of said mechanism, said casing being removed for exposing said wire adjacent said track member between said fixed casing points, said exposed wire being secured to the other of said members between said fixed points for movement relative to said fixed casing points during movement of said track members relative to each other, said Bowden wire element extending from the front fixed casing point of one adjuster mechanism to the rear fixed casing point of the other adjuster mechanism whereby the wire core forms a continuous double loop.

4. In combination with a pair of transversely spaced adjuster mechanisms extending from front to rear of a vehicle and secured to the vehicle floor, each of said mechanisms having a fixed track secured to said floor and a movable track interconnected with said fixed track for fore and aft movement, a seat secured to said movable tracks for fore and aft adjustment relative to said floor, a single continuous piece of Bowden wire interconnecting said adjuster mechanisms for synchronizing movement of said adjusters during adjustment of said seat, said Bowden wire element having an outer casing and a movable core of wire, a first fastening means for connecting the end portions of said wire at one point to one of said movable tracks for effectively forming a continuous figure 8, a second fastening means for connecting a portion of said wire equidistant from each end portion to the other movable track, clamping means for securing said casing at the front and rear of each of said fixed tracks on each side of the point said wire is connected to the associated interconnected movable track, said casing being removed from said wire between the secured casing points and the secured wire portion therebetween whereby movement of on movable track can only be accomplished when the other movable track is also moved in the same direction since their respective movements are controlled by the continuous wire interconnecting them.

5. In a vehicle seat adjusting unit of the type having first and second pairs of track members wherein each pair of track members includes a fixed track and a movable track supported in said fixed track, a seat supported upon said movable rail, said pairs of track members being spaced from each other, an improved assembly for connecting the movable tracks to each other for synchronizing the movement of said tracks with respect to each other, said improved assembly comprising: a Bowden wire having an outer casing and a wire member movable with respect to said casing, first and second clamps spaced from each other for anchoring said Bowden wire casing with respect to the fixed track of one of said pairs of track members, a single connector for attaching said movable wire member to the movable track of said one of said pairs of track members, a pair of spaced clamps spaced from each other for securing said Bowden wire casing against movement with respect to the fixed track of the other of said pair of track members, and a single connector for connecting the movable wire member of said Bowden wire to the movable track of said other of said pairs of track members.

6. In a vehicle seat adjusting unit of the type having first and second pairs of spaced track members and wherein each of said pairs of track members includes a track fixed against movement and a second track supported in said fixed track, a seat supported on said movable track for movement therewith, an improved synchronizing assembly for synchronizing movement of said movable tracks, said assembly including a Bowden wire having an outer casing and a wire member movable with respect to said casing, means for attaching said casing to the fixed track of said first one of said pair of track members at first and second points spaced from each other along said fixed track, means for attaching said movable wire member to the movable track of said first pair of track members at a point intermediate said first and second spaced attaching points, means for attaching said Bowden wire casing to the fixed track of said second pair of tracks at spaced points along said last mentioned fixed track, and means for attaching the movable wire member of said Bowden wire to the movable track of said second pair of track members at a point intermediate the points of attachment of said Bowden wire casing to said fixed track of said second of said pairs of track members.

7. In a vehicle adjusting unit of the type having first and second pairs of track members spaced from each other, each of said pairs of track members including a track fixed against motion and a second track supported in said first track for movement with respect thereto, an improved synchronizing assembly for synchronizing the movement of said movable tracks, said assembly including a closed loop Bowden wire cable in the form of a figure 8, said cable having an outer casing and an inner wire movable with respect to said casing, said casing having portions hetreof removed to expose said movable wire, a pair of spaced clamps for clamping said casing to one of said fixed tracks, a single connection disposed intermediate said clamps for connecting said movable wire to one of said movable tracks for motion therewith, a pair of spaced clamps for connecting said outer casing to the other of said fixed tracks, and a single connection connecting said movable wire to the other of said movable tracks for movement therewith.

8. In a vehicle seat adjuster of the type having spaced pairs of track members, each of said pairs of track members including a track fixed against movement and a movable track supported in said fixed track, a seat supported on said movable track for movement therewith, an improved synchronizing means for synchronizing the movement of said movable tracks, said synhcronizing means including a continuous unbroken Bowden wire formed in a double loop, said Bowden wire comprising an outer casing having a movable wire member therein and having two portions of said outer casing removed to expose two spaced segments of bare movable wire, two spaced clamps for clamping said outer casing to the fixed track of one of said track members, one of said bare segments of said movable wire extending across the space between said clamps, a single connector disposed in the space between said clamps for connecting said exposed segment of said movable wire to one of said movable tracks, two spaced clamps for clamping said outer casing to the other of said fixed tracks, the second exposed segment of movable wire extending across the space between said last mentioned clamps, and a single connector disposed in the space between said last mentioned clamps for connecting the last mentioned segment of exposed wire to the other of said movable tracks.

References Cited by the Examiner
UNITED STATES PATENTS

| | | | |
|---|---|---|---|
| 1,934,893 | 11/33 | Thomas | 248—429 |
| 2,420,728 | 5/47 | Zllrich | 248—429 |
| 3,013,763 | 12/61 | Weberman | 248—429 |
| 3,037,736 | 6/62 | James | 248—429 |

FOREIGN PATENTS

| | | |
|---|---|---|
| 421,905 | 1/35 | Great Britain. |
| 457,766 | 7/50 | Italy. |
| 640,877 | 8/50 | Great Britain. |

CLAUDE A. LE ROY, *Primary Examiner*.